US007698994B2

(12) United States Patent
Mullaney, Jr. et al.

(10) Patent No.: US 7,698,994 B2
(45) Date of Patent: Apr. 20, 2010

(54) FRYER FILTRATION ARRANGEMENT WITH BOIL-OUT BYPASS

(75) Inventors: Alfred E. Mullaney, Jr., Baltimore, MD (US); Paul Forrest, Severn, MD (US); Charles Amoss, Dundalk, MD (US)

(73) Assignee: Illinois Tool Works Inc., Glenview, IL (US)

( * ) Notice: Subject to any disclaimer, the term of this patent is extended or adjusted under 35 U.S.C. 154(b) by 1145 days.

(21) Appl. No.: 11/233,522

(22) Filed: Sep. 22, 2005
(Under 37 CFR 1.47)

(65) Prior Publication Data
US 2007/0062515 A1    Mar. 22, 2007

(51) Int. Cl.
*A47J 37/12* (2006.01)
(52) U.S. Cl. .............................. 99/330; 99/403; 99/408
(58) Field of Classification Search ........... 99/326–333, 99/339–340, 348, 403–418, 444–450; 210/167, 210/175, 232, 235, 416.1–416.5, DIG. 8, 210/167.28, 167.01; 219/437–441, 429
See application file for complete search history.

(56) References Cited

U.S. PATENT DOCUMENTS

| 445,223 | A | 1/1891 | Knight |
|---|---|---|---|
| 2,359,368 | A | 10/1944 | Klopfenstein |
| 2,424,211 | A | 7/1947 | Webb |
| 2,578,129 | A | 12/1951 | Daugherty |
| 2,610,740 | A | 9/1952 | Hunter |
| 2,635,527 | A | 4/1953 | Overbeck et al. |
| 2,760,641 | A | 8/1956 | Mies, Jr. et al. |
| 2,914,063 | A | 11/1959 | Wagner |
| 3,045,827 | A | 7/1962 | Hough |
| 3,147,220 | A | 9/1964 | Avery |
| 3,159,095 | A | 12/1964 | Wagner |
| 3,210,193 | A | 10/1965 | Martin |
| 3,263,818 | A | 8/1966 | Gedrich |
| 3,279,605 | A | 10/1966 | Shepherd |
| 3,410,199 | A * | 11/1968 | Quednau ..................... 99/403 |
| 3,477,361 | A * | 11/1969 | Bradshaw ................... 99/408 |
| 3,483,981 | A | 12/1969 | Gordon |
| 3,608,472 | A | 9/1971 | Pelster et al. |
| 3,667,374 | A | 6/1972 | Holmes |
| 3,685,433 | A | 8/1972 | Cunningham |
| 3,701,313 | A * | 10/1972 | Boggs ........................ 99/330 |
| 3,735,871 | A | 5/1973 | Bisko |
| 3,797,378 | A | 3/1974 | Morris |

(Continued)

FOREIGN PATENT DOCUMENTS

DE         2746728        4/1979

(Continued)

OTHER PUBLICATIONS

Installation, Operation and Care of Models MF50 and MF85 Mobile Filters, Instructions, Vulcan-Hart Company, 1998, pp. 1-12.

(Continued)

*Primary Examiner*—Timothy F. Simone
(74) *Attorney, Agent, or Firm*—McGuirewoods LLP

(57) ABSTRACT

A fryer unit includes a boil-out drain path that does not require boil-out fluid to pass through a pump.

17 Claims, 5 Drawing Sheets

U.S. PATENT DOCUMENTS

| | | |
|---|---|---|
| 3,894,482 A | 7/1975 | Murphy |
| 3,973,481 A | 8/1976 | Mies |
| 3,977,973 A | 8/1976 | Anderson |
| 4,084,492 A | 4/1978 | Sullivan |
| 4,113,623 A | 9/1978 | Koether et al. |
| 4,328,097 A | 5/1982 | Whaley et al. |
| 4,420,006 A | 12/1983 | Moore et al. |
| 4,444,095 A | 4/1984 | Anetsberger et al. |
| 4,487,691 A | 12/1984 | Panora |
| 4,591,434 A | 5/1986 | Prudhomme |
| 4,604,203 A | 8/1986 | Kyle |
| 4,607,857 A | 8/1986 | LeSage et al. |
| 4,623,544 A | 11/1986 | Highnote |
| 4,747,944 A | 5/1988 | George |
| 4,805,525 A | 2/1989 | Bivens |
| 4,890,548 A | 1/1990 | Grob et al. |
| 4,895,137 A | 1/1990 | Jones et al. |
| 4,899,649 A | 2/1990 | Grob et al. |
| 4,945,893 A | 8/1990 | Manchester |
| 4,959,144 A | 9/1990 | Bernard et al. |
| 4,974,501 A | 12/1990 | Grob et al. |
| 4,994,181 A | 2/1991 | Mullaney, Jr. |
| 5,143,604 A | 9/1992 | Bernard et al. |
| 5,247,876 A | 9/1993 | Wilson et al. |
| 5,253,566 A | 10/1993 | McCabe et al. |
| 5,261,322 A | 11/1993 | Yokoyama et al. |
| 5,297,474 A | 3/1994 | Tabuchi |
| RE34,636 E | 6/1994 | Bivens |
| 5,404,799 A | 4/1995 | Bivens |
| 5,449,469 A | 9/1995 | Burklund et al. |
| 5,458,772 A | 10/1995 | Eskes et al. |
| 5,486,370 A | 1/1996 | Bivens |
| 5,577,438 A | 11/1996 | Amitrano et al. |
| 5,582,093 A | 12/1996 | Amitrano et al. |
| 5,595,107 A | 1/1997 | Bivens |
| 5,597,601 A | 1/1997 | Griffin |
| 5,680,811 A | 10/1997 | Highnote et al. |
| 5,709,899 A | 1/1998 | Bivens |
| 5,731,024 A | 3/1998 | Bivens |
| 5,743,175 A | 4/1998 | Crain et al. |
| 5,870,945 A | 2/1999 | Bivens |
| 6,095,037 A | 8/2000 | Savage et al. |
| 6,235,210 B1 | 5/2001 | Saksena |
| 6,269,808 B1 | 8/2001 | Murahashi |
| 6,306,294 B1 | 10/2001 | Blair |
| 6,378,420 B1 | 4/2002 | Savage et al. |
| 6,470,794 B2 | 10/2002 | Takahashi |
| 6,572,764 B2 | 6/2003 | Mullaney |
| 6,890,428 B2 * | 5/2005 | Mullaney, Jr. .......... 210/167.28 |

FOREIGN PATENT DOCUMENTS

| | | |
|---|---|---|
| EP | 0649622 | 4/1995 |
| GB | 2 307 650 | 6/1997 |
| JP | 2001-327414 | 11/2001 |

OTHER PUBLICATIONS

Installation and Operation Manual, 47 Series Gas Fryers, Frymaster L.L.C., Nov. 1998.

Specification Sheet for Filter System for High Efficiency Fryers, Vulcan-Hart Corporation (Nov. 1986).

Operating, Installation, Service & Parts Manual for High Efficiency Fryer Filtermate, Vulcan-Hart Corporation (Jan. 1986).

"Magnum Retrofit Kit Eliminates Filter Paper," Date: 1996, 2 pages.

"840546 Magnum Filter Leaf Kit—Fry Master Footprint II (CxC)," Date: Feb. 1999, 4 pages.

"Kitchen Equipment, Frymaster Filter," Date: Apr. 1999, 1 page.

* cited by examiner

FRYER FILTRATION ARRANGEMENT WITH BOIL-OUT BYPASS

TECHNICAL FIELD

The present invention relates generally to deep-fat fryers and, more particularly, to a, deep-fat fryer cooking oil filtration arrangement that includes a boil-out bypass feature.

BACKGROUND

A typical deep-fat fryer will include a fryer vat containing a heated bath of cooking oil. The cooking oil is adapted to receive baskets of food products such that the food products will be immersed within and cooked by the heated cooking oil. Such fryers include a heat exchanger, which may take the form of in vat fire tubes and associated burners, with combusted gases being passed therethrough to heat the oil.

To extend the useful life of the cooking oil, it is a common practice to filter the particulate food matter from the cooking oil to minimize the carbonization of such food matter within the cooking oil. Various configurations of filtering systems in which oil is drained from the vat into a pan, tub or other below unit containment vessel and then passed through a filter have been provided, with a pump used to return oil to the fryer vat after the oil has been filtered.

The cleaning process for fryer vats typically involves a "boil-out" process in which the vat is filled with a mixture of oil and vinegar and the heating system of the fryer is run to produce a boiling of the mixture, which in turn cleans the vat. Once the boil-out process is completed, the mixture must be removed from the vat, preferably drained without leaving any significant amount of the mixture in the unit and without running the mixture through the pump, as that may degrade the pump/motor assembly causing early failure. Typically, oil in the vat is drained into the pan, tub or other below unit containment vessel of the oil filtering system prior to the boil-out. Upon completion of the boil-out, including removal of the cleaning mixture, the oil in the vessel is returned to the vat. Since the oil is held in the below unit vessel during boil-out, the below unit vessel is not available for draining of the cleaning mixture. It would be desirable to provide a fryer that facilitates removal or draining of the boil-out cleaning mixture.

SUMMARY

A fryer unit includes a boil-out drain path that does not require boil-out fluid to pass through a pump.

BRIEF DESCRIPTION OF THE DRAWINGS

FIG. 2 is a side elevation of the oil pan and associated filter assembly of the fryer of FIG. 1;

DETAILED DESCRIPTION

Figure 1:
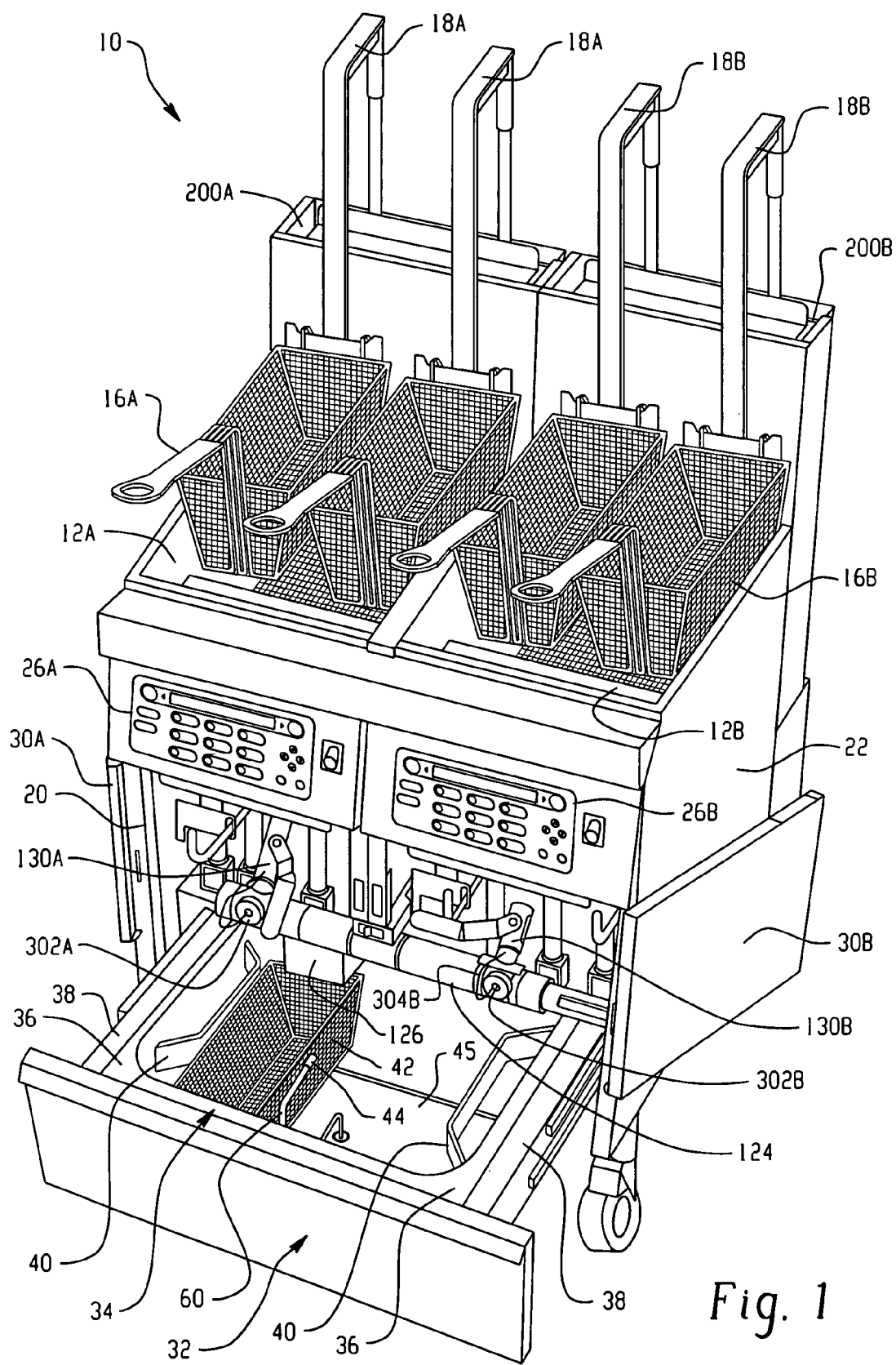
FIGS. 1 and 2 depict a prior art fryer including a filtration arrangement.
Figure 2:
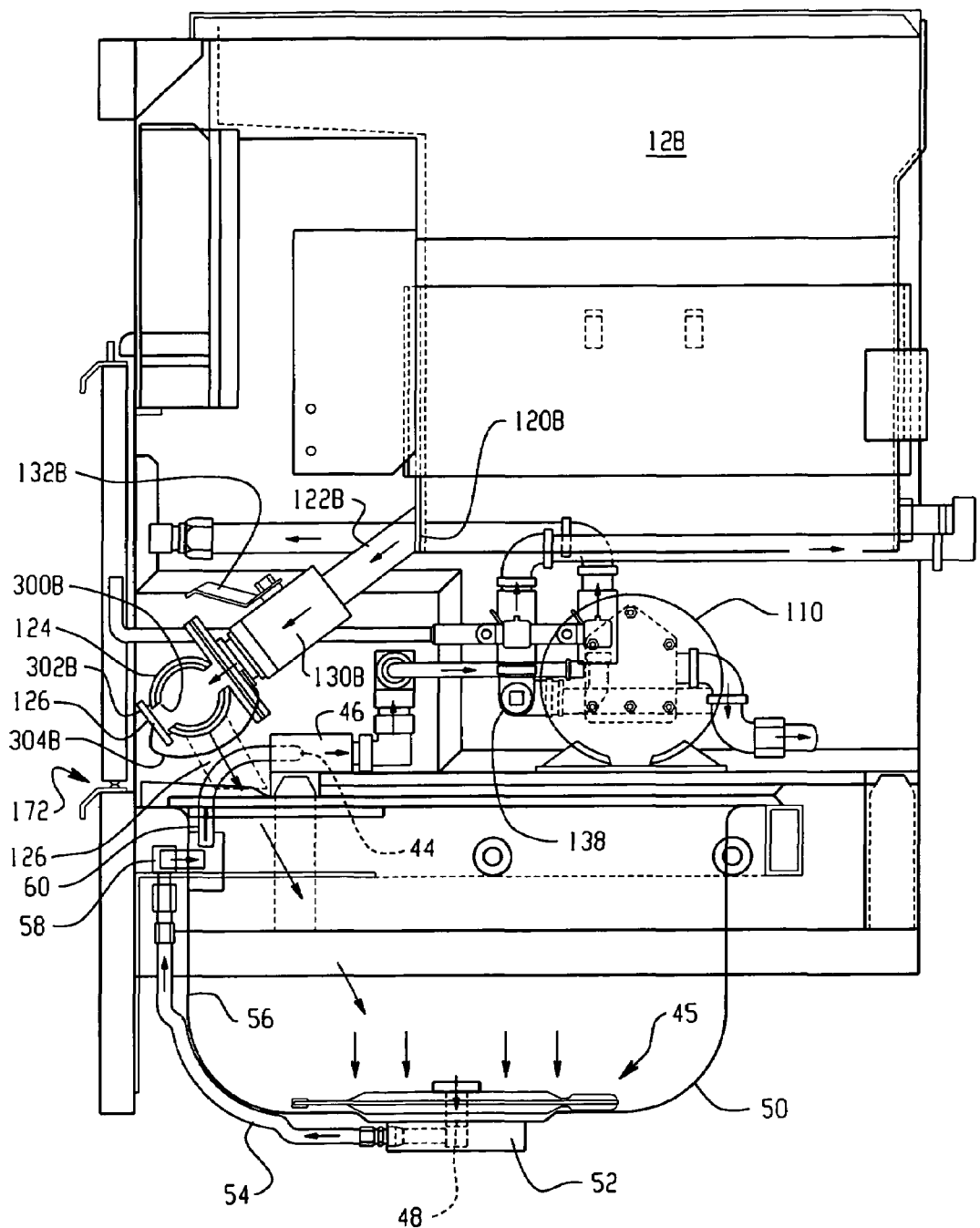

Referring to drawing FIGS. 1 and 2, a fryer filtration arrangement similar to that shown and described in U.S. Pat. No. 6,890,428 is shown, with certain modifications made for implementing the boil-out bypass feature. The fryer 10 includes two fryer vats 12A and 12B. Each fryer vat includes at least one respective basket 16A and 16B which is automatically movable upward and downward via respective positioning guides 18A and 18B in a manner well known in the art. Manual raising and lowering of the baskets is also possible in some fryers. The fryer 10 includes a frame 20 which preferably includes associated housing 22 such as stainless steel. A front panel 24 of the fryer 10 includes a control and display panel 26A and 26B for each fryer vat. The lower portion of the housing frame includes a set of doors 30A, 30B which are movable between open and closed positions, and which are illustrated in the open position. Below the doors 30A, 30B a drawer 32 which is movable between open and closed positions relative to the frame 20 is provided, the drawer being illustrated in the open position. Positioned within the drawer 32 is an oil receiving pan 34 having a rim 36 which sits on rails 38 of the drawer 32. Handles 40 extend from the interior sidewalls of the pan 34 to allow the pan to be easily picked up and removed from the drawer to facilitate cleaning at a location away from the fryer 10. Positioning of the handles 40 on the inner portion of the pan helps facilitate simple positioning of the pan in the drawer 32. As used herein, the term "pan" is intended to broadly encompass any oil receiving container, unless otherwise specifically indicated.

A basket type screen 42 is removably positioned within the pan 34 for filtering out debris entering the pan 34 within oil which is drained from one of the fryer vats 12A and 12B. At the bottom of the pan 34 a filter assembly 45 is provided for filtering the oil. An oil return path from the pan 34 back to the fryer vat 12A, 12B is formed in part by a coupler 44 which is connected to and extends from a front sidewall of the pan 34. The illustrated coupler 44 extends rearwardly back toward the fryer frame 20. A corresponding coupler 46 (FIG. 2) is positioned on the fryer frame 20, with the two couplers aligned for slidingly mating with each other in a friction fit arrangement when the drawer 32 is moved to a closed position.

In the illustrated fryer 10, each vat 12A, 12B includes an associated exhaust stack 200A, 200B formed at the back of the fryer for venting combustion gases produced by the oil heating system which includes in vat fire tubes.

Referring now to FIG. 2, the pan 34 includes an outlet opening 48 through its bottom wall 50. The oil return path is formed in part by a flow passage through member 52 and piping 54 which runs along the external surface of bottom wall 50 and front wall 56 of the pan 34.

Near the top of front wall 56 a wall penetrating coupling assembly 58 passes through the wall 56, with piping 60 extending upward from the pan 34 and rearwardly as shown. The end of piping 60 acts as the return coupler 44. The return coupler 44 mates with corresponding coupler 46.

The oil return path leads back to the fryer vat and includes a pump 110, which may be driven by an electric motor, positioned therealong for drawing oil out of the pan 34 and pumping it back to the vat. Oil traveling out of the pan 34 during a filtration operation travels from the pan 34, through the outer filter screen material of the filter assembly 45, into the interior of the filter assembly 45, and out of the interior of the filter assembly 45. Operation of the pump 110, and the associated flow of oil drawn out of the pan 34, creates a suction force for holding the coupler of the filter assembly 45 to the coupler of the pan 34, without requiring any latch or hold down member. The suction force created by the pump 110, and the associated flow of oil drawn out of the pan 34, also holds the return coupler 44 of the pan 34 to the corresponding coupler 46 of the fryer frame 20 so as to maintain the drawer 32 in a closed position during a filtration operation, without requiring any positive latch.

In FIG. 2, the fryer vat 12B is shown. An outlet opening 120B in a wall of the 12B leads to a draining pipe 122B. The draining pipe 122B leads to a drain pipe/manifold 124 which extends laterally across a front portion of the fryer 10 as seen in FIG. 1. The drain pipe 124 includes an outlet 126 for delivering oil into the pan 34. Fryer vat 12A includes a similar drainage path to the manifold 124. Thus, each vat 12A, 12B includes a respective oil drain path extending from its outlet opening to the pan 34. Positioned along each oil drain path is a flow control device 130A, 130B for controlling the draining of each vat. In particular, each flow control device may be a manually operable valve including a respective handle 132A, 132B for permitting a user to open and close the drain path as desired. Of course, other flow control devices may be used, including automatically controlled devices.

In connection with the boil-out cleaning process, one vat at a time is typically cleaned. For example, with respect to vat 12B, drain valve 130B would be opened to allow the oil from vat 12B to drain into the pan 34. The oil may be circulated through the vat 12B, pan 34 and filter 45 for a period of time to filter out debris. The drain valve 130B is then closed. The vat 12B can then be filled with the cleaning fluid, which as described above may be a combination of oil and vinegar. The heating system for vat 12B is then operated to bring the cleaning fluid to a boil for a cleaning time period, after which the cleaning fluid can be removed from the vat 12B. In this regard, the manifold 124 includes boil-out drain opening 300B that is typically covered by a cap member 302B, which may have an associated tether 304B to avoid loss of the cap member when removed. The opening 300B is located in line with the drain path pipe 122B and the drain valve 130B. In the illustrated 2-vat fryer, a similar boil-out drain opening and cap member 302A is provided in line with drain valve 130A (see FIG. 1). The boil-out drain openings are adapted to receive a drain pipe as will be described in detail below.

Figure 3:
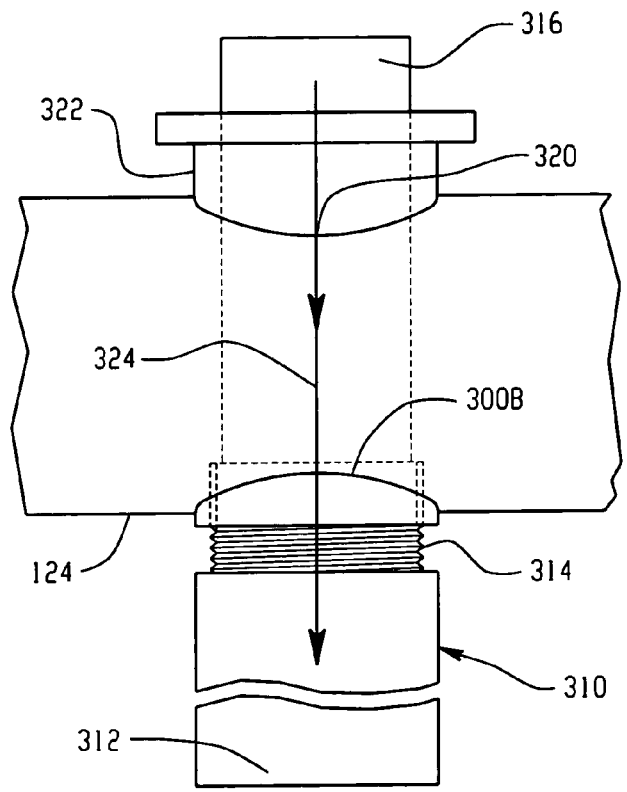
FIG. 3 depicts one embodiment of a boil-out drain pipe.
Figure 4:
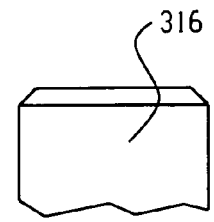
FIG. 4 depicts an alternative embodiment of the end of a boil-out drain pipe.
Figure 5:
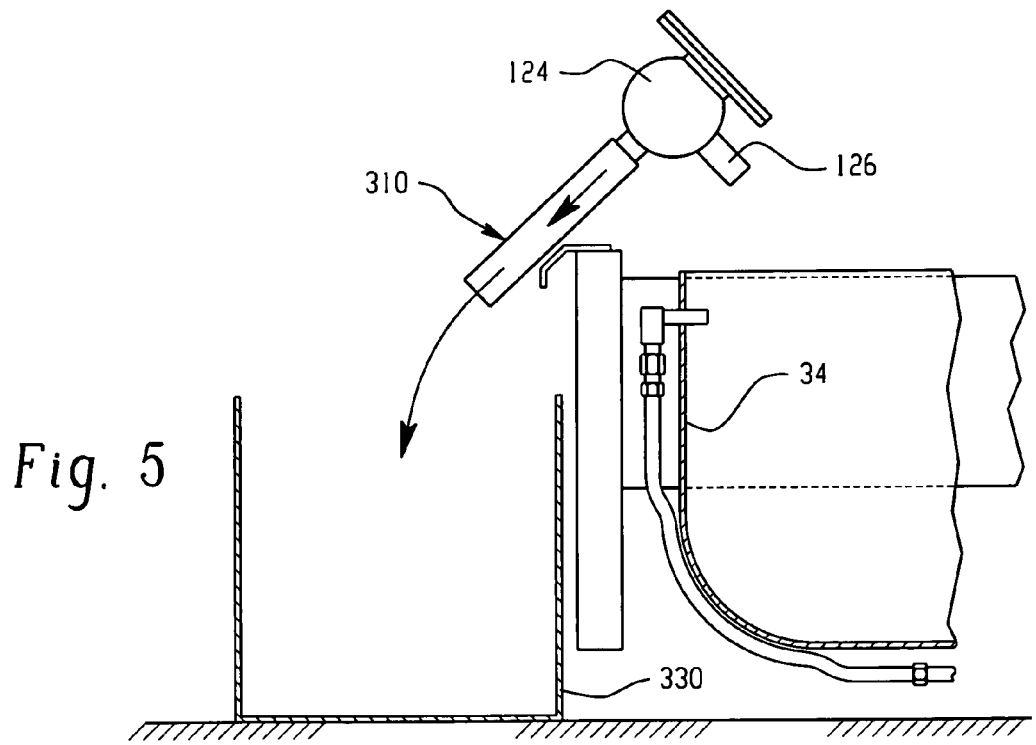
FIG. 5 is a partial side view depicting position of the installed boil-out drain pipe.

Referring now to FIG. 3, in one embodiment, the boil-out opening 300B is internally threaded to threadingly receive the drain pipe 310. The cap member may likewise include external threads for closing the opening. The illustrated boil-out drain pipe has an unthreaded drain end 312, an externally threaded middle coupling portion 314 and an unthreaded, smaller diameter extension 316 which passes through diametrically opposite opening 320. Opening 320 includes an associated mount flange 322 to which the drain valve 130B (not shown) can be coupled. The end of extension 316 may be sized and configured for seating against an internal portion of the drain valve so that, with drain pipe 312 in place, when the drain valve is opened, the boil-out cleaning fluid bypasses the manifold 124 and instead passes directly along the drain pipe path 324 and out of the drain pipe 310, thereby avoiding mixing of the boil-out cleaning mixture with the oil in the pan. Once the boil-out cleaning mixture is drained, the valve is closed and the drain pipe is unthreaded from opening 300B. The cap member is then replaced, returning the fryer unit to its normal operating configuration. Referring to FIG. 4, in an alternative embodiment; the end of the extension 316 could be tapered as shown, for seating against the inside surface of the flange 322. Referring to the partial side view of FIG. 5, note that the boil-out drain pipe 310 can be installed with the drawer unit in its closed position, and extends forward of the drawer unit, enabling a boil-out container 330, such as a bucket or pan, to be placed in the front of the unit to receive the draining boil-out cleaning fluid. This feature is advantageous because, in many cases, the pan 34 will contain the vat oil and it would be undesirable to have to pull the pan out in such instances.

Figure 6:
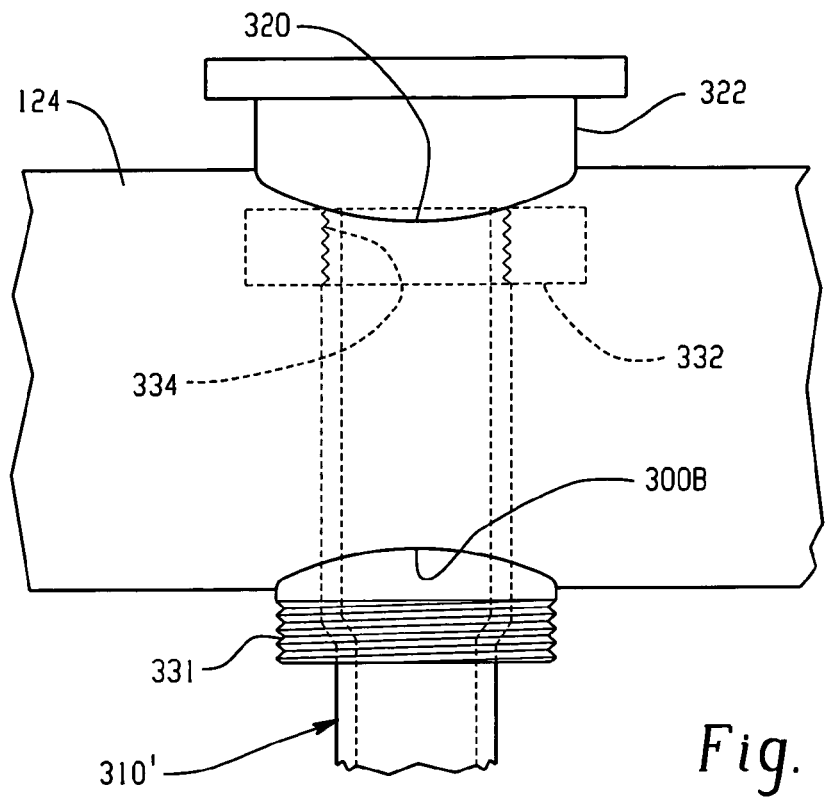
FIGS. 6 and 7 show an alternative embodiment of a boil-out drain pipe.
Figure 7:
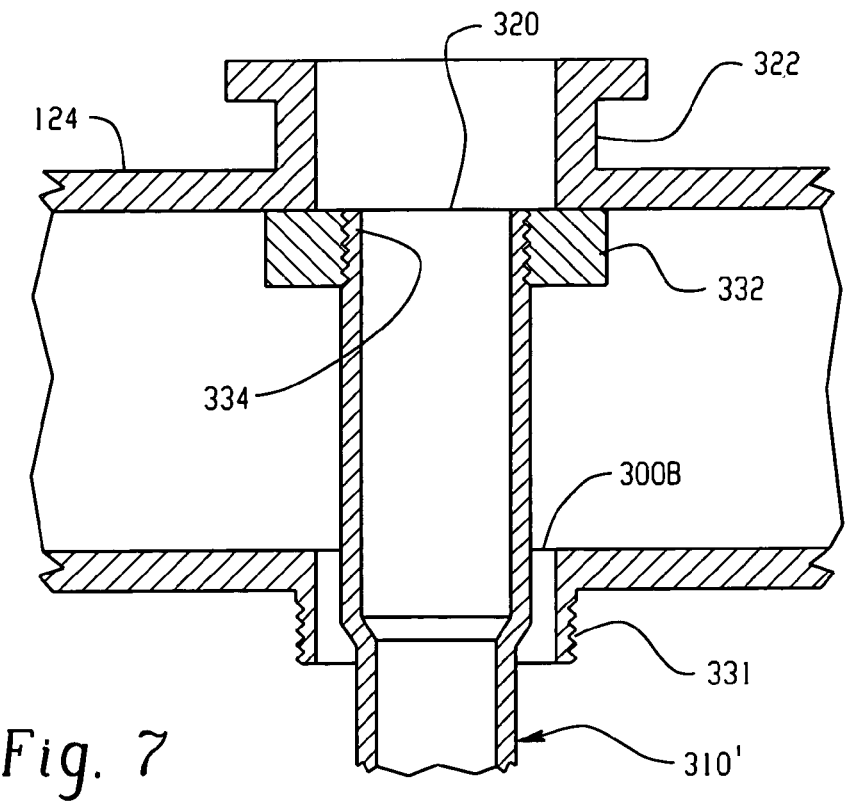

Referring now to FIGS. 6-7, another embodiment is shown in which boil-out opening 300B includes a flange 331 that is externally threaded (in which case the cap member is internally threaded for attachment). The boil-out drain pipe 310' passes through opening 300B without connection thereto. The opening 320 is includes an internally located threaded coupling 332 for receiving the end 334 of the drain pipe 310' which is correspondingly threaded. Similar to FIG. 5, the drain pipe 310' may extend out past the drawer when installed, facilitating positioning of a boil-out cleaning fluid receiving vessel.

Thus, for a typical boil out of a given vat, oil is drained from the vat into the pan by opening the drain valve. The drain valve is closed. The vat is filled with the boil-out cleaning fluid. The heating system of the vat is operated for a cleaning time period. The cap member associated with the boil-out opening for the vat is removed. The boil-out drain pipe is installed. The boil-out cleaning fluid vessel is positioned in front of the fryer below the outlet of the boil-out drain pipe. The drain valve associated with the vat is opened, allowing the boil-out cleaning fluid to exit the unit via the boil-out drain pipe, bypassing the manifold. The valve is closed. The boil-out drain pipe is removed. The cap member of the boil-out opening is put back in place and the drain valve is closed. The oil in the pan is pumped back into the vat. In this way, the pump need not be used for moving the boil-out cleaning fluid, and the under unit oil-receiving pan or other vessel can be kept in place during the entire boil-out process.

Figure 9:
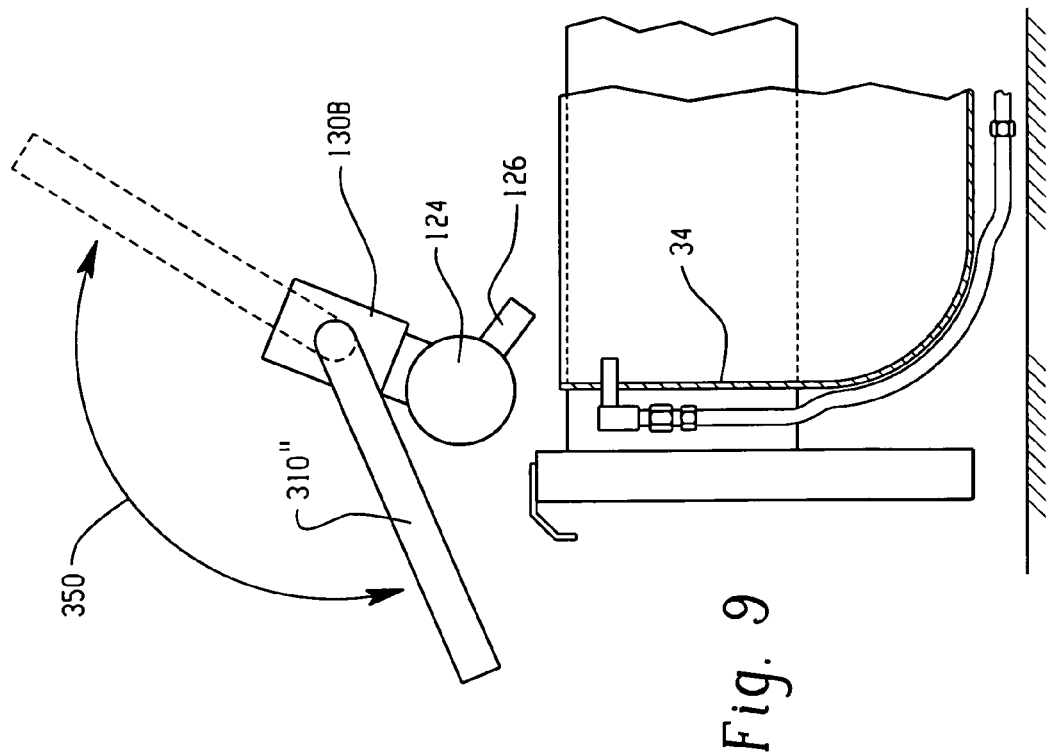
FIG. 9 shows a schematic of en embodiment having a stowable drain pipe.
Figure 8:
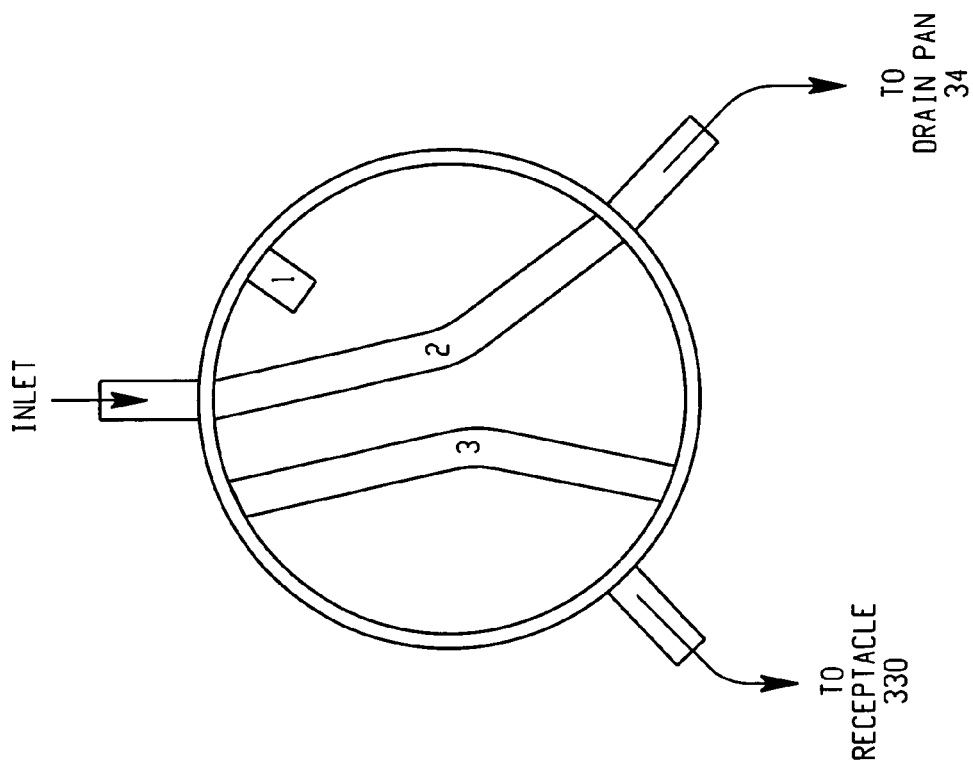
FIG. 8 shows a schematic of an alternative embodiment using a three way valve.

In an alternative embodiment, as shown in FIG. 8, the valve 132B could be replaced by a three way valve. In one position, the valve is closed, preventing the contents of the vat from draining. In a second position the valve is opened to allow oil to be drained into the manifold 124 and ultimately into the oil-receiving drain pan 34. In a third position the valve is opened to a allow the boil-out cleaning liquid to be diverted by a separate drain line/boil-out drain pipe, which need not be associated at all with the manifold, to a receptacle 330 for disposal. In one embodiment of this implementation the separate boil-out drain pipe may be a component that is not regularly removed from the fryer. Instead, and as shown in FIG. 9, the boil-out drain pipe 310'' could be movable, as by rotation per arrow 350, between a stowed position within the fryer (shown in dashed line form) and a use position in which the boil-out drain pipe extends forward of the front of the fryer (shown in solid line form).

Various boil-out drain pipe constructions have been shown and described. Regardless of the exact construction, the pipe may be formed as a single piece or as multiple different pieces coupled together as by press fitting or welding. The boil-out drain pipe could also be formed, in part or in whole, of a flexible or hose-like material. It is also recognized that the boil-out bypass path could be used for draining oil from the vat into a front located receptacle such as receptacle 330 of FIG. 5.

Variations on the foregoing are possible. For example, while a fryer including two vats has been shown above in the illustrated embodiment, fryers including more or less vats could incorporate the subject boil-out drain feature. While the various constructions have been described primarily in conjunction with vat 12B, it is recognized that in a multi-vat fryer apparatus each fryer vat could readily include a similar boil-out bypass feature.

The invention claimed is:

1. A fryer unit, comprising:
a fryer vat configured to fry with oil and to be washable with boil-out fluid, the vat comprising an outlet opening;
a vessel for receiving the oil drained from the fryer vat via the outlet opening, the vessel movable from an under-unit position to a frontwardly extending position;
an oil drain path leading from the outlet opening of the fryer vat to the vessel;
an oil return path for delivering oil from the vessel back to the fryer vat, the oil return path including a pump;
a filter associated with at least one of the oil drain path, the vessel and the oil return path;
a drain valve located along the oil drain path for controlling draining of the fryer vat;
a boil-out drain path having an inlet positioned to intercept the boil-out fluid drained from the vat such that the boil-out fluid is not delivered to the vessel, the boil-out drain path including an outlet end positioned forward of a front of the fryer unit so that the boil-out fluid can be delivered under force of gravity to an external container without passing through the pump and while the vessel is in the under-unit position.

2. The fryer unit of claim 1 wherein the boil-out drain path comprises a boil-out drain pipe positioned downstream of the drain valve.

3. The fryer unit of claim 2 wherein the oil drain path includes a laterally extending manifold, the boil-out drain pipe extends within the manifold.

4. The fryer unit of claim 3 wherein the manifold includes an inlet opening for receiving oil passing through the drain valve, an inlet end of the boil-out drain pipe extends from the inlet opening of the manifold and into contact with a portion of the drain valve.

5. The fryer unit of claim 3 wherein the inlet opening of the manifold includes an associated threaded coupling, an inlet end of the boil-out drain pipe is threadedly connected with the threaded coupling.

6. The flyer unit of claim 2 wherein the boil-out drain pipe is removable.

7. The fryer unit of claim 3 wherein the boil-out drain pipe extends from a manifold opening and is removable, and a cap member is provided for closing the manifold opening when the boil-out drain pipe is removed.

8. The fryer unit of claim 7 wherein the cap member is tethered to the fryer unit to prevent loss.

9. The fryer unit of claim 1 wherein the drain valve comprises a three way valve having an inlet, a first outlet associated with a downstream portion of the oil drain path, and a second outlet associated with the boil-out drain path.

10. The fryer unit of claim 9 wherein the boil-out drain path comprises a boil-out drain pipe movable to a stowed position in which the outlet end of the boil-out drain path is located within the fryer unit.

11. The fryer unit of claim 2 wherein the boil-out drain pipe is of a rigid construction.

12. The fryer unit of claim 2 wherein the boil-out drain pipe comprises a flexible, hose-type member.

13. A fryer unit, comprising:
a fryer vat configured to fry with oil and to be washable with boil-out fluid, the vat comprising an outlet opening;
a vessel for receiving the oil drained from the fryer vat, the vessel movable from an under-unit position;
an oil drain path leading from the outlet opening of the fryer vat to the vessel;
an oil return path for delivering oil from the vessel back to the fryer vat, the oil return path including a pump;
a filter associated with at least one of the oil drain path, the vessel and the oil return path; and
a boil-out drain path for draining the boil-out fluid from the fryer vat to a location external of the fryer unit so that the boil-out fluid can be delivered under force of gravity to an external container without passing through the pump and while the vessel is in the under-unit position.

14. The fryer unit of claim 13 wherein the boil-out drain path comprises a removable boil-out drain pipe.

15. The fryer unit of claim 14 wherein the boil-out drain pipe is of a rigid construction.

16. The fryer unit of claim 13 wherein the boil-out drain path comprises a boil-out drain pipe movable to a stowed position within the fryer unit.

17. The fryer unit of claim 16 wherein the boil-out drain pipe is of a rigid construction.

\* \* \* \* \*